United States Patent [19]

Raahauge

[11] 4,024,547
[45] May 17, 1977

[54] INSTRUMENT RECORDING PEN

[75] Inventor: Jerald Carl Raahauge, Escondido, Calif.

[73] Assignee: Kingmann-White, Inc., Placentia, Calif.

[22] Filed: Aug. 13, 1975

[21] Appl. No.: 604,261

[52] U.S. Cl. .............................. 346/140 A; 346/49
[51] Int. Cl.² .................. G01D 15/16; G01D 9/38; G01D 9/30
[58] Field of Search .............. 346/140 R, 140 A, 49

[56] References Cited

UNITED STATES PATENTS

| | | | |
|---|---|---|---|
| 2,137,592 | 11/1938 | Shepard | 346/140 A |
| 2,216,248 | 10/1940 | Moore | 346/140 A |
| 3,611,430 | 10/1971 | Watchorn et al. | 346/140 A |
| 3,778,840 | 12/1973 | Dahl | 346/140 A X |
| 3,893,130 | 7/1975 | Browning et al. | 346/140 A |

FOREIGN PATENTS OR APPLICATIONS 29,209  12/1910  United Kingdom ........... 346/140 A Primary Examiner—George H. Miller, Jr.
Attorney, Agent, or Firm—Knobbe, Martens, Olson, Hubbard & Bear

[57] ABSTRACT

An instrument pen system employing disposable fiber tip pens comprising relatively flat oblong cartridges having a depending nib for engaging a chart. The pens are mounted on the ends of instrument arms and the nibs are angled to enable their tips to record lines very close to each other on the chart. The flat shape of the cartridges enables the cartridges with the shorter nibs to move between the chart and the cartridges with the longer nibs. The cartridges are formed with integral lugs which enable a cartridge to be easily mounted on or removed from the instrument arm while still maintaining the low profile.

12 Claims, 7 Drawing Figures

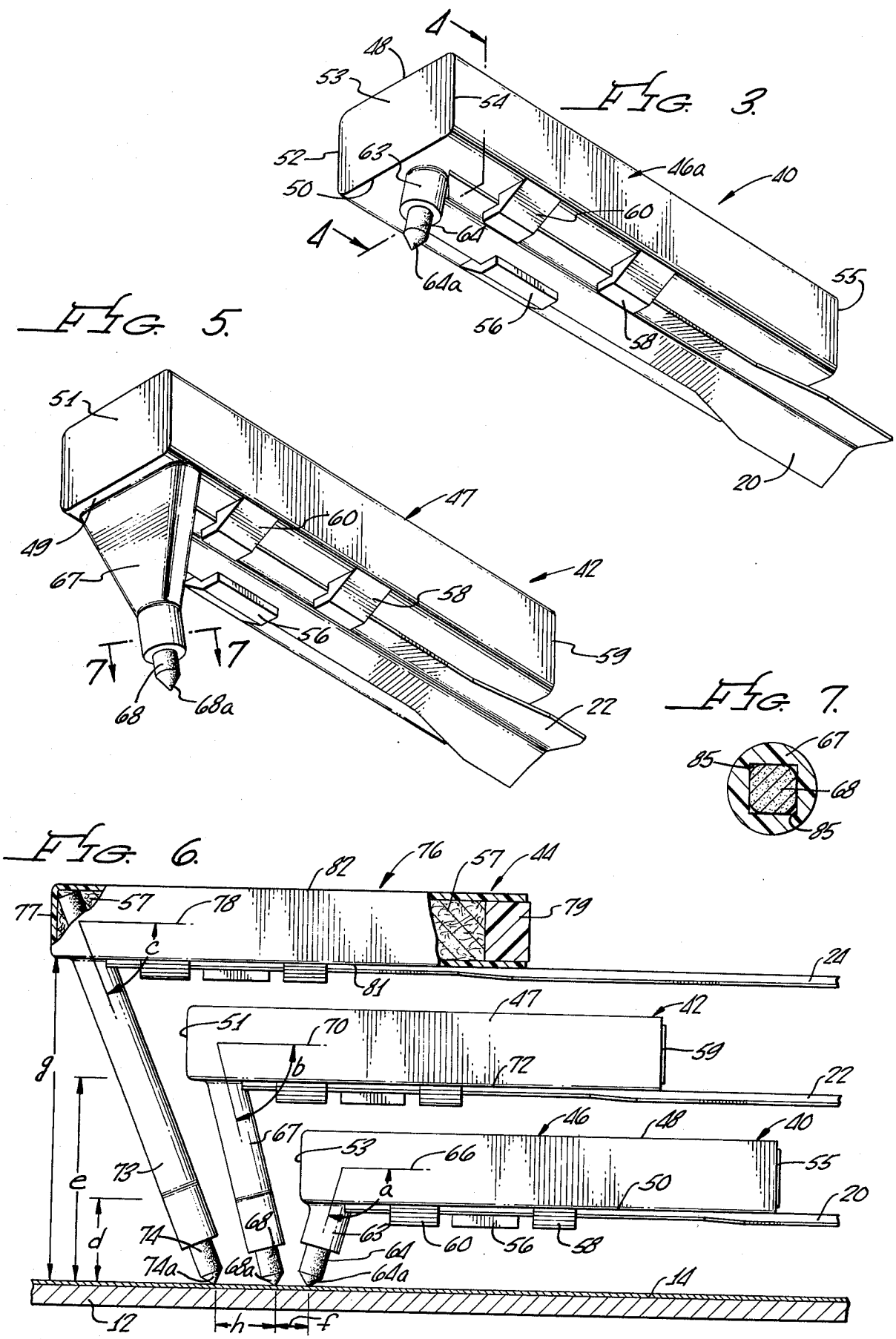

INSTRUMENT RECORDING PEN

This invention relates to apparatus for recording values of any variables incidental to the operation of industrial plants, such as pressures, temperatures or other information that is to be indicated and recorded. More particularly, the invention relates to an improved pen system for such recording apparatus.

Instrument pens often must record lines upon a circular chart which is rotated at a uniform speed. In one common system the chart makes a complete revolution every 24 hours. In another type of apparatus, the record is taken upon a continuously driven paper web or roll advancing at a uniform speed.

With both these types of recording instruments, it is frequently required to record several variables simultaneously on the same chart. This, in practice, makes it advisable to mount the recording pen arms, which carry the recording pens, on a common axis, and in a manner that places the pen tips close together. When two or more pens are making records simultaneously on the same chart, the record lines may frequently cross each other, and hence the system must be able to accommodate such crossing. It is often desirable to use different colors for each pen to insure clear legibility and accuracy in the reading interpretation of the recordings.

Until recently, the recording pens usually employed in practice were of two general types. In one approach, a small open cup or container, usually of steel, is mounted on the recording pen arm and the ink is directed onto the chart by a small diameter tube. Because of the weight, these containers are necessarily of small capacity and require frequent filling by means of droppers. The larger these moving reservoirs are made, the more the weight variation interferes with the accuracy of the meter or recording instrument. Also such cups are usually open to the atmosphere and operate in locations where the ink can become contaminated by the presence of dust. Consequently, the instruments employing them require quite constant attention.

In another approach, the pen system employs a supply of ink adjacent the chart and feeds the ink by way of a small diameter tube to a pen carried on the chart arm. This so-called capillary or siphon approach has been widely used and has several advantages. However, reliable and uniform ink feeding is sometimes a problem. Also considerable effort has been expended to prevent flooding in areas where several pens frequently oscillate back and forth across ink lines just drawn by an adjacent pen.

Another approach which avoids some of the problems of the other systems is to have a sealed disposable cartridge mounted on the end of an instrument arm. This approach has the advantage of reducing service time, in that, it eliminates messy ink handling and cleaning of equipment. On the other hand, it is necessary that such self-contained or disposable systems meet several criteria in order to be successful and acceptable. As with the open cup pens, the weight of the units must be kept low in order to not adversely affect the accuracy of the recording instrument. Further, the self-contained units must be sufficiently compact so as not to interfere with adjacent instrument arms and cartridges when one recording crosses another. It is also necessary that the pen tips be very close together since the simultaneous recordings should appear as being at approximately the same time and need not be transposed onto an additional chart. The units should also be easily mounted and removed from the recording arms. Finally, to be competitive, the system must, of course, be reasonable in cost compared to the earlier systems.

In accordance with the present invention, the foregoing objectives have been obtained in an improved self-contained disposable ink cartridge. The cartridge has a relatively flat elongated shape so that it occupies a minimum of space in a direction away from the chart and thereby permits a second arm to pass closely adjacent thereto. A similarly shaped cartridge mounted on the second arm has a pen nib sufficiently longer than the pen nib on the first cartridge to reach the chart and the nibs on the two cartridges are angled towards each other so as to be more closely spaced than they would be if each nib simply extended perpendicularly away from its cartridge. The cartridges are provided with a simple but reliable lug arrangement for quickly and easily mounting a cartridge onto the end of a recording arm.

A third recording arm is frequently desired. It is provided with a cartridge similar to the others, but the nib is sufficiently long to reach the chart while permitting the first and second arms to pass between the third arm and the chart. The nib on the third pen is angled back towards the second nib, so as to keep the nib tips close together.

Further features and attendant advantages of the invention will become more apparent by reference to the following detailed description and drawings of the preferred embodiment in which:

FIG. 3 is an enlarged perspective view of the pen of the subject invention which is positioned closest to the recording chart;

FIG. 5 is an enlarged perspective view of the pen which is positioned second closest to the recording chart;

FIG. 6 is an enlarged side elevational view of the three pens mounted on the instrument arms showing the compactness of the arrangement and the angular relations; and FIG. 7 is a cross section of a pen nib and holder, on line 7—7 of FIG. 5.

Figure 1:
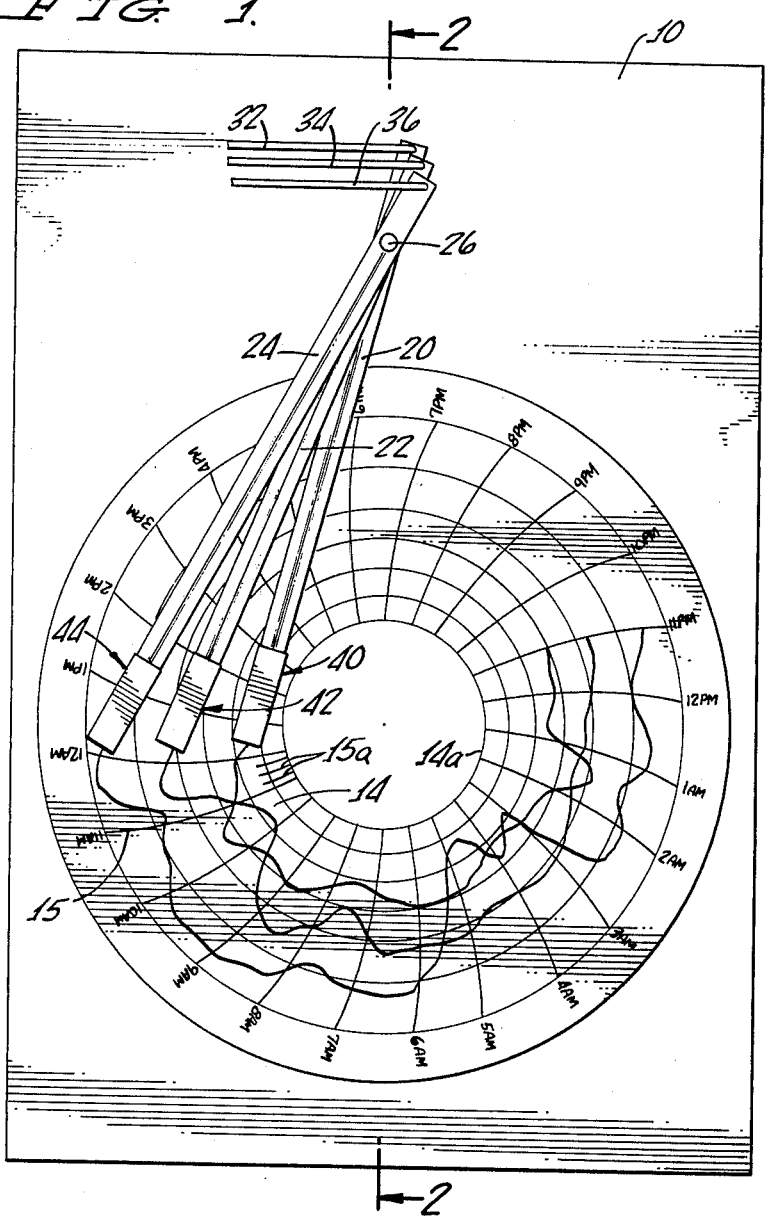
FIG. 1 is a front elevational view of the instrument recording system of the invention.
Figure 2:
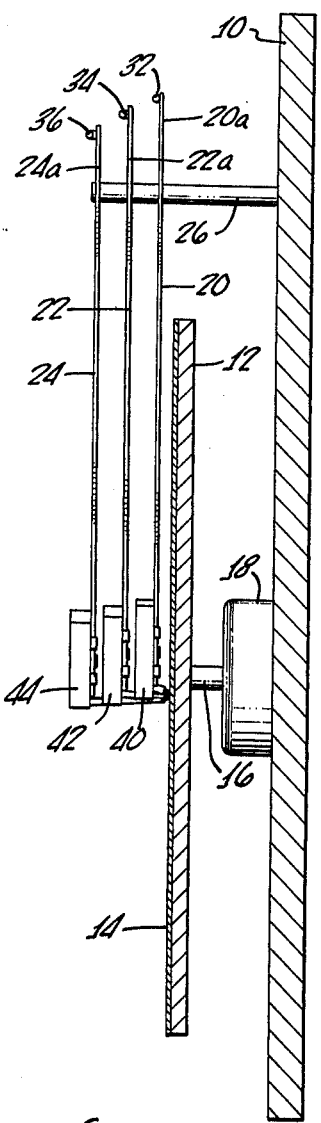
FIG. 2 is a cross-sectional view of the system of FIG. 1 on lines 2—2 of FIG. 1.

Referring to FIGS. 1 and 2, there is schematically shown an instrument having a vertically mounted back plate 10 spaced from a vertically oriented face plate 12. A circular chart 14 is fixed to the face plate 12. The face plate is rotatable by means of a shaft 16 connected to a timing motor 18 supported on the back plate or by other suitable means.

A plurality of pen or recording arms 20, 22 and 24 are rotatably mounted on a support shaft assembly 26 mounted in cantilever fashion to the back plate 10. The shanks 20a, 22a and 24a of each of the instrument arms are respectively attached to suitable links 32, 34 and 36, the movements of which are controlled by a corresponding variable element, or the state of some material, to be recorded on the chart 14.

Figure 4:
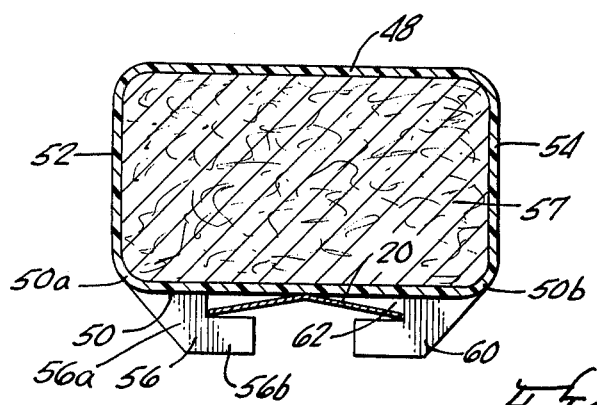
FIG. 4 is a cross-sectional view of the pen of FIG. 3 mounted on its pen arm along line 4—4.

Respectively mounted on the unsupported or free ends of the pen arms 20, 22 and 24 are disposable self-contained pens 40, 42 and 44. Referring to FIGS. 3 and 4, it may be seen that the pen 40, which is closest to the chart 14 in use, includes an oblong shaped cartridge 46 having a pair of walls 48 and 50 which are relatively wide joined by a pair of shorter side walls 52 and 54, and a pair of end walls 53 and 55. The side wall 50 which faces the recording chart 14 in operation has three lugs 56, 58 and 60 extending outwardly therefrom for attaching the cartridges on the pen arm 20 as may be seen in FIGS. 2, 3 and 4. More specifically, one edge 50a of the cartridge wall 50 has a single lug 56 and the other edge 50b of that wall has a pair of spaced lugs 58 and 60 extending therefrom positioned to straddle the lug on the other side. As may be seen from FIG. 4, each of the lugs has somewhat of an L-shaped cross-section including a first portion 56a attached to the wall 50 of the cartridge facing the chart and a second portion 56b extending towards the lugs 58 and 60 on the opposite edge. In this manner, the lugs define a small space 62 for receiving the pen arm 20 which has a flattened V-shaped cross-section. The dimensions of the space 62 defined in relation to the pen arm are such that the cartridge slips easily but snugly onto the arm.

Extending from the cartridge wall 50 which faces the chart on the pen 40 positioned closest to the chart is a tubular pen nib holder 63 integral with the cartridge and holding a fiber nib 64 having a tip 64a for writing on the chart. As seen from FIG. 6, the nib 64 extends into the interior of the cartridge where it is in intimate contact with a fibrous filler material 57 soaked with ink. As can be seen, the nib 64 is located near the cartridge end wall 53 which is furthest from the pen support shaft. The pen nib angles outwardly from the pen support shaft 26 or away from the other end wall 55 of the cartridge. Preferably, the pen nib is oriented at an angle a of about 105° with respect to the wall 50 or the longitudinal axis 66 of the cartridge 46. Thus the nib is angled about 15° with respect to the perpendicular distance between the cartridge and the chart, as seen in FIG. 6. The distance d from the wall 50 to the chart is about 0.2 of an inch in a production version of the system.

Referring to FIGS. 1, 2, 5 and 6, the pen 42, which in use is second closest to the chart 14, has a cartridge 47 which is the same as the cartridge 46 of the pen 40. However, the pen 42 has a pen nib holder 67 supporting a nib wherein the holder and the portion of the nib extending beyond the holder are longer than the height of the closest cartridge 46 and its nib holder 63 and projecting nib 64 to insure clearance if recordings formed by these two nibs should overlap. Also the pen nib holder 67 has somewhat of a V-shape with the portion attached to the cartridge 47 having side fillets extending almost across the width of the wall 49 to provide strength to the structure. In a preferred form of the invention, the distance e between the second cartridge 47 and the chart is about ½ inch.

The nib holder 67 on the second cartridge 47 extends from one end 51 of the cartridge back towards the other end 59 of the cartridge at an angle b of 75°, with respect to the wall 72 of the cartridge, or its longitudinal axis 70. Note that this arrangement places the pen nib 68 at an angle of 75° with respect to the chart 14, and places the pen tips 64a and 68a of the nibs 64 and 68 very close to each other if the recordings should overlap. In a preferred form of the invention, the distance f between the two is about one tenth of an inch.

As has been mentioned, this enables the nibs to scribe their lines simultaneously along approximately the same time arcs 15 indicated on the chart. These arcs are all on a radius substantially equal to the average of the radial distance from the axis of the support shaft 26 to the pen tips. Having the pen tips extremely close together enables the single chart to record related variable items occurring simultaneously. This avoids the necessity of preparing combined record graphs of different variables on a reconstructed chart if it is desired to shown graphically the relation of different variables to each other at the same moment. The distance f between the pen tips is equal to the distance between two 15 minute arcs 15a at the inner zero circle 14a on the chart 14. The radius of said inner circle is about 1⅜ inches for a standard chart. This relationship provides a convenient spacing for adjusting the tracings in analyzing the chart results.

Referring to FIGS. 2 and 6, the remaining pen 44 which is furthest from the chart has a cartridge 76 like that of the other two pens, but it has a nib holder 73 and a nib 74 which, while similar to the nib holder 67 and nib 68, are longer. The nib 74 angles from one end 77 of its cartridge 76 towards the other end 79; or in other words, back towards the support 26 for the pen arms. This nib must, of course, be long enough to enable the third cartridge 76 to pass over the two pens 40 and 42 which are closer to the chart. In a preferred form of the invention, this distance g between the cartridge 76 and the chart 14 is about eight-tenths of an inch. The nib is oriented at an angle c of about 65° to 70° with respect to the wall 81 of the cartridge or the longitudinal axis 78 of the cartridge. Thus the nib is at that same angle with respect to the chart. This angular relation enables the tip 74a of the nib 74 to be positioned close to the tip 68a of the nib 68 of the middle pen 42 so that all three pen tips are very close together, when their recordings overlap. In a production version of the pen, the distance h between the tips of the second and third nibs is about 0.145 inches. Thus all three pens move along approximately the same time arc.

In a preferred form of the invention, the pen cartridges are made of a lightweight thermoplastic material such as polypropylene. The fiber filler material 57 within the cartridge may be a bonded diacetate or other such material. The nib is preferably made of dacron, which is stiffer than the filler 57 but yet is relatively soft so that the pen will write with a relatively light force.

As mentioned above, the nib must be in good contact with the filler 57 to insure that the ink in the filler will properly flow into the nib. Thus it is important that the nib have a large surface area contacting the filler and that the filler be urged against the nib. It is also important that there are no substantial voids in the cartridge in which ink could collect and possibly leak from the cartridge.

To accomplish the foregoing objectives, the pen nib 74, referring to the pen 44 as shown in FIG. 6, is first pushed into the nib holder 73 until it engages the upper cartridge wall 82. The opening in the nib holder 73 has a square cross section, while the nib has a circular cross section, the diameter of which is slightly larger than a side of the square cross section. Consequently, the nib 74 is tightly gripped by the nib holder 73 and small corner spaces 85 are formed between the nib and the nib holder. This is shown in FIG. 7 for the pen 42. The spaces permit air to enter the cartridge to replace the ink as the ink is utilized.

With the nib in position, the filler 57 is inserted into the cartridge through the opening covered by the end wall 79. The filler 57 is forced in and around the portion of the nib 74 in the cartridge and held under compression by closing the cartridge with the end wall 79. Note that the wall 79 has some depth to it so that when it is inserted into the cartridge it is applying pressure to the filler 57. This also facilitates binding or sealing the wall 79 to the cartridge by suitable means, a preferred method being ultrasonic bonding.

It should be noted that the desire to have considerable surface contact between the nib and the filler affects the compact arrangement of the pens. If the nibs for the pens 42 and 44 were angled more acutely with respect to the cartridges, the upper ends of the nibs would engage the end walls 51 and 77. This would limit the extent to which the nibs could be inserted into the cartridge, and hence reduce the surface contact between the nib and the filler. In the case of the pen 44 this could be avoided by having the cartridge body extend beyond the nib; however for the pen 42, having the cartridge extend further beyond the nib would prevent the pen 44 from being quite so close to the pen 42. This is undesirable, as explained above.

In use, the self-contained fiber pens provide many advantages over the open container systems of the capillary systems mentioned above. The self-contained approach has a lower initial cost and is more economical overall because of requiring no maintenance and ease of installation and replacement. The alignment of the pen tip to the chart is not very critical nor is pen tension to the chart. Also pen pressure on the chart need not be large, such as with a ball point pen. With the felt or fiber pen tip, no meniscus is required as in a conventional ink pen. The pen tip will not clog from chart fibers or contaminated ink; and the pen will not lose its prime or flood. The pen can be used in any position. The fast drying ink eliminates blotting, splatters or runs on the chart. Further, the self-contained pens are particularly reliable in situations in which there is considerable vibration, pulsation, oscillating flow, intermitting flow, or temperature extremes. They are also advantageous on portable or mobile units.

As mentioned above, the self-contained units can be operated for longer periods of time than the open container type with the same or less weight. Nevertheless, the self-contained units do not introduce a significant hysteresis lag or error into the recordings. In a laboratory test comparing the hysteresis of the self-contained fiber tip pen described in the drawings with that of a comparable bucket pen, the fiber tip pen had approximately 50% less hysteresis. The test was performed on a 20 inch water column, differential pressure meter sold by ITT Barton, utilizing steel bucket pens and pens of the type described herein. This meter has the lowest output torque of any on the market, and thus provides the most stringent operating conditions for a hysteresis test. The steel bucket pens used weigh on average slightly less than the fiber pens utilized. The pressure on the pens was 1½ to 2½ grams on the chart paper at the pen nib.

During the test, the pens were first started at a midrange point 11 on a standard circular chart, moved radially to the outer ring or periphery on the chart and then returned to midrange, while the chart rotated. The hysteresis for the steel bucket pen was 0.25% and the fiber tip pen hysteresis was 0.10%. The same result was obtained in moving the pens radially inwardly to the zero or inner circle 14a and back to midrange. The hysteresis from the beginning midrange point to the ending midrange point was 0.05% for the steel bucket pens and 0% for the fiber tip pen. Thus it can be seen that superior performance was obtained by the fiber tip pen during the test. Improvements of this magnitude can be quite important if money is being paid based on an instrument reading such as in a natural gas well, for example.

The foregoing does not consider the recording time or the length of recording line of the bucket type pen versus the fiber tip pen. However, for most any operating condition the fiber tip pen records a longer amount or for a longer time than the steel bucket pen of comparable weight. Two major reasons for this are that the buckets are heavy and the buckets are not completely filled with ink, because of spillage problems. In a production version, the fiber tip pen weighs less than 1 gram and will write about 1800 feet with a 2 to 4 gram force, providing a line width of 0.007 to 0.018 inches. The weight of the cartridge is divided into about ⅓ for the body, ⅓ for the fiber filler and pen tip, and about ⅓ for ink.

What is claimed is:

1. In a recording instrument having a plurality of lightweight pen arms mounted on a pivot axis and means for moving the arms over the surface of a chart in response to a condition to be recorded, said chart having a plurality of curved lines representing time which are spaced at predetermined time intervals, such as fifteen minutes, said lines being on a radius about equal to the average distance between said axis and the tips of pens to be mounted on said arms, said arms being spaced different distances from the chart so that a first arm closest to the chart can move between the chart and a second arm spaced further from the chart:
   a disposable, self-contained pen to be mounted on the end of each of said arms, each of said pens having a substantially closed plastic cartridge containing a fiber material soaked in ink and including a nib holder formed integral with a wall of the cartridge and a writing nib positioned in said holder with one end extending into the cartridge and the other end extending out of the cartridge and having a writing tip to engage the chart, each of said cartridges having a generally flat rectangular cross-section to minimize the space requirement for the cartridges in a direction away from the chart so that the cartridges do not interfere with each other when the first cartridge is moved between the second cartridge and the chart, the pen nib and holder to be mounted on said first arm being located adjacent one end of its cartridge and angled away from the other end of its cartridge, the pen nib to be mounted on said second arm being longer than the first nib and being located adjacent one end of its cartridge and angled toward the other end of its cartridge so that the tips of said pen nibs when mounted on the instrument arms in overlapping relation are positioned closer together than if each nib extended at the same orientation with respect to its cartridge, the distance between the tips of said pen nibs being equal to the distance between said time lines at a reference location on said chart, said pens each weighing less than 1 gram so that a minimum amount of hysteresis error is introduced into the recordings being made.

2. The apparatus of claim 1 wherein each of said nibs is angled at approximately 75° with respect to the wall of its cartridge intended to face the chart.

3. The apparatus of claim 1 wherein the distance between the tips of said nibs is equal to about one-tenth of an inch when their recordings overlap.

4. The apparatus of claim 1 wherein the thickness of the cartridge, that is, its dimension extending away from the chart and not including the mounting means, is preferably less than one-fifth of an inch.

5. The instrument of claim 1 wherein said nib extends into the cartridge and engages the wall of the cartridge opposite from which the nib is supported.

6. The instrument of claim 1 wherein said fiber material holding the ink is bonded diacetate and said nib is dacron.

7. The instrument of claim 1 wherein each of said pens will provide about 1800 feet of writing with a 2 to 4 gram force and a line width of about 0.007 to 0.018 inches.

8. The apparatus of claim 1 including a third cartridge to be mounted on a third support arm spaced from the chart a distance sufficient to permit the first and second arms to move between the chart and said third arm, said third cartridge having a nib on one end longer than the combined length of the first and second nibs angled toward the other end of the third cartridge so as to permit the ends of all three of the nibs to be positioned closely together.

9. The apparatus of claim 8 wherein the length of the pen nibs in a direction perpendicularly away from the cartridges which determines the spacing between the chart and the cartridges is approximately two-tenths of an inch for the first cartridge, five-tenths of an inch for the second cartridge and eight-tenths of an inch for the third cartridge.

10. The apparatus of claim 1 wherein each of said cartridges has means on the wall of the cartridge to face the recording chart for receiving the flat configuration of one of said supporting arms to thereby support the cartridge.

11. The apparatus of claim 10 wherein said means for supporting the cartridge includes lugs integral with the cartridge which form a space for receiving one of said supporting arms.

12. Apparatus of claim 11 wherein said lugs include a first lug formed on one edge of said wall of the cartridge and a pair of lugs formed on the opposite edge of said wall and spaced from each other to straddle said first arm, each of said lugs including a first portion extending away from said wall and a second portion spaced from but extending approximately parallel to said wall to define said space for frictionally receiving the pen arm.

* * * * *